United States Patent Office 3,652,549
Patented Mar. 28, 1972

3,652,549
PRODUCTION OF ε-CAPROLACTAM
Isamu Fujita, Ishibashi Ikeda, and Kiyoshi Otoi, Kuwata-cho, Ibaraki, Japan, assignors to Kanegafuchi Boseki Kabushiki Kaisha, Tokyo, Japan
No Drawing. Filed July 18, 1968, Ser. No. 745,702
Int. Cl. C07d 41/06
U.S. Cl. 260—239.3                                13 Claims

ABSTRACT OF THE DISCLOSURE

ε-Caprolactam, useful as a raw material in the manufacture of nylon, is prepared by the gaseous catalytic reaction of at least one compound of the formula $$X-(CH_2)_4COY$$

wherein X is $-CH_2OH$, $-CHO$, $-(CH(OR)(OR'))$, $-COOH$, $-COONH_4$, $-CONH_2$ or $COOR''$, Y is $-OH$, $-ONH_4$, $-NH_2$ or $-OR'''$ and each of R, R', R'' and R''' is methyl, ethyl, propyl, butyl or cyclohexyl, with ammonia, hydrogen and/or steam in the presence of a copper-chromite catalyst.

---

This invention relates to novel processes for preparing ε-caprolactam and more particularly to a process for preparing ε-caprolactam characterized by the gaseous catalytic reaction of at least one compound represented by the general formula:

$$X-(CH_2)_4COY \quad (1)$$

wherein X represents $-CH_2OH$, $-CHO$, $$-CH(OR)(OR')$$

$-COOH$, $-COONH_4$, $-CONH_2$ or $COOR''$, Y represents $-OH$, $-ONH_4$, $-NH_2$ or $-OR'''$ and each of R, R', R'' and R''' is methyl, ethyl, propyl, butyl or cyclohexyl group, with ammonia, hydrogen and/or steam in the presence of a copper-chromite catalyst.

The demand of ε-caprolactam as a raw material for 6-nylon or 6-nylon copolymers has recently rapidly increased with the development of the nylon industry and numerous researches have been made on processes for preparing ε-caprolactam.

There are already known some processes for the preparation of ε-caprolactam. Most of them involves a Beckmann rearrangement of cyclohexanone oxime. The process utilizing the Beckmann rearrangement reaction has been industrially carried out. However, according to this method the by-production of a large amount of ammonium sulfate is inevitable so that it is necessary to consider the disposal of ammonium sulfate produced together with the lactam.

As a process for preparing ε-caprolactam without by-producing ammonium sulfate, there is known a process (U.S. Pat. No. 3,000,880) wherein a mixture of ε-caprolactone and aqueous ammonia is heated at a temperature above 375° C. in the absence of a catalyst in an autoclave. However, in such process, in order to increase the yield of ε-caprolactam, it is necessary to employ a high temperature above 375° C. Therefore, the pressure must also be increased. Thus there are disadvantages that a reaction apparatus resistant to such high pressure is required and that the reaction time is long.

It is also known to produce ε-caprolactam by reacting adipic acid or its derivative with ammonia and hydrogen in a liquid phase in the presence of a catalyst. For the catalyst, there is used an ordinary hydrogenating catalyst or a combination of such hydrogenating catalyst and a dehydrating catalyst (British Pat. Nos. 778,253 and 802,072). However, in such process, it is necessary to carry out the reaction at a high temperature of about 200° C. under a high pressure of 200 to 300 atmospheres for more than 10 hours and the yield of ε-caprolactam is so low (less than 30%) and the by-product is so large in the amount.

Further, there is known a process (U.S. Pat. No. 2,351,934) for preparing ε-caprolactam by catalytically reacting adipic acid in a gaseous phase with ammonia and hydrogen under the normal pressure. In such case, there is used a hydrogenating-dehydrating catalyst such as nickel-phosphoric acid. However, in such process, there is formed a large amount of by-products such as hexamethylene imine, aminocapronitrile and adiponitrile. Therefore, this method is also not industrially practical.

There are also known processes wherein derivatives of oxycaproic acid and formylvaleric acid are used as the materials (refer, for example, to U.S. Pat. Nos. 3,000,-877, 3,000,879, 2,840,553 and 2,840,554 and German Pat. No. 952,442). They all involve a liquid phase high pressure reaction with ammonia in the absence of a catalyst or in the presence of a hydrogenating catalyst. The yield of ε-caprolactam in these methods is not satisfactorily high. Further, these methods are disadvantageous because a high pressure apparatus is required.

We have found that when the compound of the general Formula 1 is reacted with ammonia and hydrogen and/or water in a gaseous phase in the presence of a copper-chromite catalyst, ε-caprolactam can be industrially easily produced with a high yield.

The present catalytic reaction is carried out by charging a thermostatic (or temperature adjustable) reaction vessel with copper-chromite catalyst, heating it by such means as an electric furnace and passing a gaseous mixture of ammonia and hydrogen and/or steam through the reaction vessel. The catalyst may be fixed or may be fluidized.

The starting material which is to be used in the present invention is a compound represented by the general formula:

$$X-(CH_2)_4COY \quad (1)$$

wherein X represents $-CH_2OH$, $-CHO$, $$-CH(OR)(OR')$$

$-COOH$, $-COONH_4$, $-CONH_2$ or $COOR''$, Y represents $-OH$, $-ONH$, $-NH_2$ or $OR'''$, and each of R, R', R'' and R''' represents methyl, ethyl, propyl, butyl or cyclohexyl group. The compounds represented by the Formula 1 include adipic acid, oxycapronic acid and formylvaleric acid and their esters, amides, ammonium salts and acetal derivatives.

Examples of adipic acid derivatives are ammonium adipate, adipamido acid and its ammonium salt and mono- or diesters of adipamide and adipic acid. Examples of the esters are preferable to be methyl ester, ethyl ester, propyl ester, butyl ester and cyclohexyl ester.

Examples of the oxycapronic acid derivatives are ammonium oxycaproate and esters of oxycaproic acid. Examples of the esters are preferable to be methyl ester, ethyl ester, propyl ester, butyl ester and cyclohexyl ester.

For the formylvaleric acid derivatives, there may be mentioned formylvaleric acid esters and acetal esters of formylvaleric acid. Preferable examples of the alcohol portion of the esters and acetals are methyl alcohol, ethyl alcohol, propyl alcohol, butyl alcohol and cyclohexyl alcohol.

A mixture of two or more of these compounds can also be used.

These compounds may be prepared in various known manners. However, it is preferable to oxidize cyclohexane with air to obtain a mixture of adipic acid, oxycaproic acid and formylvaleric acid. The resulting mixture as such may be used as a starting material of the reaction of this invention. The mixture may also be used after being esterified, acetalized, amidated or ammoniumated.

Needless to say, there can be used adipic acid obtained by oxidizing cyclohexane, cyclohexanol or cyclohexanone with air or nitric acid. Also oxycaproic acid obtained by acid-treating an air-oxidization product of cyclohexanol may also be used in this invention.

The copper-chromite catalyst (also known as copper chromium oxide catalyst) to be used in the process of the present invention is a catalyst containing copper and chromium, together with or without a further metal described in the following. The catalyst is prepared in the form of metal oxides, which are reduced with hydrogen before the use for the reaction.

There are various processes for producing the catalyst. The most preferable process is to decompose basic copper ammonium chromite. For example, the catalyst may be prepared by thermally decomposing and then molding a precipitate produced by adding a concentrated aqueous ammonia to a mixed aqueous solution of a copper salt, dichromate and if desired another metal salt. Another method is to mix and mold oxides of corresponding metals. The thus prepared catalyst is reduced with hydrogen and is then used for the reaction.

In the gaseous phase reaction of this invention, a catalyst consisting only of copper is low in the activity and short in effective life. Further, a catalyst consisting only of chromite or chromium oxide has no catalytic activity at all. Only with a copper-chromite catalyst, $\epsilon$-caprolactam can be obtained at a high yield in the process of this invention.

Further, a copper-chromite added with a small amount of another metal is also effective. With such three-component catalyst, not only a favorable catalytic effect will be developed by the interaction of the respective components but also the selectivity of $\epsilon$-caprolactam is remarkably improved. Examples of metals to be added are barium, magnesium, calcium, strontium, aluminum, gallium, titanium, vanadium, manganese, iron, cobalt, nickel, zinc, molybdenum, ruthenium, rhodium, palladium, silver, cadmium, tin, lead, antimony and bismuth.

The copper-chromite catalyst may be employed as such in a shaped or molded form, or it may be deposited on a carrier such as kieselguhr, silica gel, alumina or pumice.

Preferable composition of the present catalyst is 0.01 to 5 atoms, more preferably 0.1 to 3 atoms of chromium per atom of copper. When the content of chromium deviates from this range, the catalytic activity and stability of the catalyst will both tend to reduce. Preferred amount of the metal to be added is 0.001 to 1 atom or more preferably 0.01 to 0.2 atom per atom of copper.

The reaction temperature may vary depending on the kind and activity of the catalyst. However, a temperature of 120 to 350° C., particularly 170 to 300° C. is preferable. At a temperature lower than 120° C., not only the reaction will be not proceeded to a satisfactory extent but also a comparatively high degree of pressure reduction will be required in order to prevent the liquefaction of the raw material and reaction product, the space-time yield of $\epsilon$-caprolactam will reduce. On the other hand, at a high temperature above 350° C., the reaction itself will be accelerated but the secondary reaction will be so remarkable that the yield of $\epsilon$-caprolactam will reduce.

Preferred reaction pressure may range from 0.01 to 5 atmospheres and most preferably 0.5 to 3 atmospheres. Since the reactants are of comparatively high boiling points it is necessary to properly set the partial pressure and reaction temperature for maintaining the reaction system in the vapor state.

The amount of ammonia is not critical, but a satisfactory result is obtained when the amount of ammonia is in the range of 1 to 100 mols or preferably 2 to 50 mols per mol of the starting compound(s) of the Formula 1.

Hydrogen is to be consumed to reduce adipic acid or formylvaleric acid or its derivative, but is important also to keep the catalytic activity and to increase the selectivity of the $\epsilon$-caprolactam production. Therefore, even in case the raw material is oxycaproic acid or its derivative requiring no reduction, the presence of hydrogen will be indispensable.

The partial pressure of hydrogen to be usually used in the present invention is in the range of 0.01 to 3 atmospheres, preferably 0.1 to 1.5 atmospheres.

The space velocity of the reaction gas may vary depending on the reaction pressure, temperature and composition of the reaction gas. In general, however, the space velocity may be varied over a range from 20 to 20,000 l./(hr.)(l.) and preferably from 100 to 10,000 l.(hr.)(l.).

When the reaction is carried out under these reaction conditions, $\epsilon$-caprolactam will be obtained easily at a high yield. However, some catalysts will tend to reduce in the catalytic acitvity gradually with the progress of the reaction. As a result of investigating the causes of such catalytic activity reduction, we have found that it is not caused by the change of the catalyst itself but that the reactants adsorbed on the catalyst surface will resinify to cover the catalyst and therefore the reactivity will reduce. We have also found that when steam or water vapor is added to the reaction system the reduction of the catalytic activity can be prevented.

Thus steam is added to the gas to be passed to the reaction vessel. The amount of steam may vary depending on the particular reaction conditions, but may range from 0 to 200 mols or preferably from 10 to 100 mols per mol of the starting compound. Further effect of the addition of steam is to increase the selectivity of the $\epsilon$-caprolactam production.

The reaction mixture resulting from the reaction under these conditions is cooled as quickly as possible and is condensed in a receiver. The condensate is a colorless or light yellow colored liquid containing a major proportion of $\epsilon$-caprolactam and minor amount of unreacted raw material, ammonia and water and a small amount of a nitrogenous compound. These reaction products can be separated by conventional distillation or by extraction with an organic solvent. The uncondensed gas consists mostly of ammonia and hydrogen which may be recycled.

For the above described reactor, there may be employed a gas-tight apparatus provided with a vaporizer for such reaction raw material as adipic acid, oxycaproic acid or formylvaleric acid or its derivative, gas mixer, gaseous mixture preheater, reaction tube, reaction exhaust gas cooler and reaction product receiver. The reactor may be adjusted to be under a predetermined reduced or elevated pressure.

The starting material, ammonia, hydrogen and steam are fed at predetermined rates respectively to the mixer. The order of mixing of them can be properly varied. Thus, for example, ammonia and hydrogen may be mixed in advance. The form, type, material and performance of this apparatus are not limited to the concept of the present invention. The charged gas may be contacted with the catalyst by the so-called fixed bed system, fluidized bed system or moving-bed system.

EXAMPLE 1

(A) Preparation of catalyst 260 g. of cupric nitrate $Cu(NO_3)_2 \cdot 3H_2O$ were dissolved in 900 cc. water at 80° C. so as to be 900 cc., and then was added 900 cc. of a solution prepared by dissolving 151 g. of ammonium dichromate and 250 cc. of a concentrated aqueous solution of 28% ammonia in water at 25° C. The precipitate formed was suction-filtered, dehydrated and was dried in an oven at 75 to 80° C. for 20 hours. The solid product was then powdered. This powder was heated to be decomposed. After the generation of the gas ceased, the decomposition product was left to cool, soaked in 600 cc. of 10% aqueous solution of acetic acid for 30 minutes, filtered, washed with six 100 cc. portions of water and dried at 125° C. for 12 hours. The powders obtained are shaped into 10 mesh of particles, placed in a reactor and was reduced therein with hydrogen below 200° C.

(B) Preparation of ε-caprolactam

A vertically positioned reaction tube of an inside diameter of 24 mm. and a length of 1000 mm. made of quartz was charged with the above prepared copper-chromite catalyst. Then the upper space of the reaction tube was filled with ceramic Raschig rings so as to form a preheating zone. This reaction tube was externally heated and the catalyst was reduced with hydrogen. Then the temperature of the catalyst bed was kept at 260° C. An ice-cooled receiver for the reaction product was provided at the bottom of the reaction tube. Dimethyl adipate and water were respectively gasified by passing through a vaporizer and then mixed with hydrogen and ammonia. Then this gaseous reaction mixture was passed through the reactor. The pressure in the reactor was atmospheric. The composition of the gaseous reaction mixture was 2% dimethyl adipate, 18% ammonia, 44% hydrogen and 36% water. The space velocity of the gas was 720 l./(hr.)(l.).

After five hours the reaction product in the receiver was analyzed with a gas chromatograph and it was observed that the conversion of dimethyl adipate was 91% and the selectivity of ε-caprolactam was 87%. When the reaction product was distilled, there was obtained ε-caprolactam of a boiling point of 114 to 115° C./3 mm. Hg. It was identified as ε-caprolactam by the elementary analysis and infrared absorption spectrum.

For comparison, a liquid phase reaction in an autoclave was conducted. Thus, 17.4 g. of dimethyl adipate, 205 g. of an aqueous solution of 12.5% ammonia and 3 g. of the copper-chromite catalyst powder prepared in the preparation (A) of Example 1 were put into an autoclave of a capacity of 500 cc. Then hydrogen was charged under 50 atmospheres and the reaction was conducted at 290° C. for 5 hours. After the reaction, the solution was extracted with chloroform. The chloroform extract was distilled to obtain 0.7 g. (yield 6%) of crude ε-caprolactam. At the end of the reaction, the catalyst was red indicating that the activity was reduced.

EXAMPLE 2

A reaction was conducted by using the copper-chromite catalyst prepared in (A) of Example 1 and the same reactor as in (B) of Example 1, but using methyl oxycaproate as the starting compound.

The pressure in the reactor was atmospheric. The reaction temperature was 260° C. The composition of the gaseous mixture was 2% methyl oxycaproate, 8% ammonia, 50% hydrogen and 40% steam. The space velocity of the gas was 720 l./(hr.)(l.).

After 5 hours of reaction, the reaction product in the receiver was analyzed with a gas chromatograph. The conversion of methyl oxycaproate was 98% and the selectivity of ε-caprolactam was 89%.

EXAMPLE 3

A reaction was conducted by using the copper-chromite catalyst prepared in (A) of Example 1 and the same reactor as in (B) of Example 1 but using methyl formylvalerate as a raw material.

The pressure in the reactor was atmospheric. The reaction temperature was 260° C. The composition of the gaseous mixture was 2% methyl formylvalerate, 8% ammonia, 50% hydrogen and 40% steam. The space velocity of the gas was 1000 l./(hr.)(l.).

At the end of 5 hours reaction, the reaction product in the receiver was analyzed with a gas chromatograph. The conversion of methyl formylvalerate was 91% and the selectivity of ε-caprolactam was 89%.

EXAMPLE 4

A reaction was conducted by using the copper-chromite catalyst prepared in (A) of Example 1 and the same reaction as in (B) of Example 1, but using a mixture of dimethyl adipate, methyl oxycaproate and formylvaleric acid methyl ester dimethyl acetal as the starting raw material. The starting raw material had been prepared by esterifying and acetalizing with methanol the product obtained by the air-oxidation of cyclohexane, and had a composition of 61 mol percent adipic acid, 35 mol percent oxycaproic acid and 4 mol percent formylvaleric acid.

The pressure in the reactor was atmospheric, the reaction temperature was 280° C., the composition of the gaseous mixture was 3% of the above mentioned reaction raw material, 27% ammonia, 40% hydrogen and 30% steam, and the space velocity of the gas was 1200 l./(hr.)(l.).

The reaction product in the receiver at the end of 10 hours reaction was analyzed with a gas chromatograph. The conversion was 100% and the selectivity of ε-caprolactam was 86%.

EXAMPLE 5

A series of reactions was conducted by using as catalysts not only copper-chromite but also, for comparison, copper-zinc oxide, nickel-kieselguhr, Raney cobalt, platinum-carbon and palladium-carbon. As the starting compound, dimethyl adipate was used.

The pressure in the reactor was atmospheric, the space velocity of the gaseous mixture was 1000 l./(hr.)(l.) and the composition of the gas was 3% dimethyl adipate, 27% ammonia, 50% hydrogen and 20% nitrogen. For the reaction temperature was set a temperature adapted to each catalyst. The results of analyses of the reaction product at the end of 2 hours of the reaction are shown in Table 1.

TABLE 1

| Catalysts | Reaction temperature (° C.) | Dimethyl adipate conversion rate (percent) | ε-Caprolactam selectivity (percent) |
| --- | --- | --- | --- |
| Copper-chromite | 270 | 88 | 92 |
| Copper-zinc oxide | 300 | 32 | 1 |
| Nickel-kieselguhr (45% Ni) | 200 | 83 | 0 |
| Raney cobalt | 200 | 66 | 0 |
| Platinum-carbon (5% Pt) | 200 | 89 | 0 |
| Palladium-carbon (5% Pd) | 200 | 78 | 0 |

As evident from Table 1, the other ordinary hydrogenating catalysts than the copper-chromite catalyst have substantially no lactamating activity and give low boiling point decomposition products, whereas only copper chromite gives ε-caprolactam at a high yield.

EXAMPLE 6

Reactions were conducted by using methyl oxycaproate as a reaction raw material and using, as catalysts, not only copper-chromite but also, for comparison, Raney copper, copper-zinc oxide, nickel-kieselguhr, Raney cobalt, platinum-carbon and palladium-carbon.

The pressure in the reactor was atmospheric, the space velocity of the gaseous mixture was 1200 l./(hr.)(l.) and the composition of the gas was 5% methyl oxycaproate, 25% ammonia, 50% hydrogen and 30% nitrogen. For the reaction temperature was set a temperature adapted to each catalyst. The results of analyses of the reaction products at the end of 2 hours of the reaction are shown in Table 2.

TABLE 2

| Catalysts | Reaction temperature (° C.) | Methyl oxycaproate conversion rate (percent) | ε-Caprolactam selectivity (percent) |
|---|---|---|---|
| Copper-chromite | 265 | 78 | 87 |
| Raney copper | 270 | 46 | 6 |
| Copper zinc oxide | 300 | 49 | 3 |
| Nickel-kieselguhr (45% Ni) | 200 | 84 | 0 |
| Raney cobalt | 200 | 33 | 1 |
| Platinum-carbon (5% Pt) | 200 | 165 | 0 |
| Palladium-carbon (5% Pd) | 200 | 81 | 0 |

As in the above, it is evident that only the copper-chromite catalyst is very effective to the preparation of ε-caprolactam.

EXAMPLE 7

The effect of water vapor was demonstrated in the reaction wherein copper-chromium-barium oxide catalyst (Cu:Cr:Ba=1:1:0.1) was used.

The pressure in the reactor was atmospheric, the reaction temperature was 310° C., the space velocity of the gaseous mixture was 700 l./(hr.)(l.) and the composition of the gas was 3% adipic acid diethyl ester, 17% ammonia, 40% hydrogen, 0 or 40% steam and 40 or 0% nitrogen.

The results are shown in Table 3.

TABLE 3

| | Conversion (percent) | | ε-Caprolactam selectivity (percent) | |
|---|---|---|---|---|
| Steam concentration (percent) | After 3 hours | After 30 hours | After 3 hours | After 30 hours |
| 0 | 81 | 33 | 72 | 43 |
| 40 | 96 | 95 | 89 | 93 |

As evident from Table 3, when no steam was added, with a reaction time of 3 hours, both of the conversion of diethyl adipate and the selectivity was considerably high. However, after 30 hours, both conversion and selectivity reduced quickly. On the other hand, when steam was present, both conversion and selectivity were remarkably high and no substantial fluctuation of the them with the lapse of time was observed.

EXAMPLE 8

This example again shows the effect of steam in the reaction where ethyl oxycaproate is used as the starting compound. The same copper-chromium-barium oxide (Cu:Cr:Ba=1:1:0.1) as in Example 7 was employed. The pressure in the reactor was atmospheric, the reaction temperature was 270° C., the space velocity of the gaseous mixture was 1000 l./(hr.)(l.) and the composition of the gas was 5% ethyl oxycaproate, 15% ammonia, 40% hydrogen, 0 or 40% steam and 40 or 0% nitrogen. The results of the reactions are shown in Table 4.

TABLE 4

| | Conversion (percent) | | ε-Caprolactam selectivity (percent) | |
|---|---|---|---|---|
| Steam concentration (percent) | After 5 hours | After 40 hours | After 5 hours | After 40 hours |
| 0 | 81 | 28 | 78 | 15 |
| 40 | 86 | 83 | 85 | 80 |

EXAMPLE 9

A series of reactions were conducted by using a copper-chromium-manganese oxide catalyst (Cu:Cr:Mn=1:1:0.1)

and using various adipic acid derivatives shown in Table 5 as reaction raw materials.

The reaction temperature was 290° C., the pressure in the reactor was atmospheric, the space velocity of the gaseous mixture was 1000 l./(hr.)(l.) and the composition of the gas was 2% of the adipic acid or its derivative, 8% ammonia, 50% hydrogen and 40% steam.

The results of analyses of the reaction products at the end of 4 hours' reaction are shown in Table 5.

TABLE 5

| Raw materials | Conversion (percent) | ε-Caprolactam selectivity (percent) |
|---|---|---|
| Adipic acid | | [1] 83 |
| Dimethyl adipate | 99 | 91 |
| Diethyl adipate | 100 | 93 |
| Dipropyl adipate | 95 | 87 |
| Adipamide | | [1] 89 |

[1] Yield.

NOTE.—The conversion of adipic acid and adipamide was difficult to measure so that the yield of ε-caprolactum on the fed raw material was indicated.

EXAMPLE 10

A series of reactions were conducted by using a copper-chromium-zinc oxide catalyst (Cu:Cr:Zn=1:0.8:0.05) and using oxycaproic acid and its derivatives shown in Table 6.

The pressure in the reactor was atmospheric, the reaction temperature was 280° C., the space velocity of the gaseous mixture was 700 l./(hr.)(l.) and the composition of the gas was 4% of the raw material, 26% ammonia and 70% hydrogen. The results of analyses of the respective reaction products at the end of 3 hours' reaction are shown in Table 6.

TABLE 6

| Raw materials | Conversion (percent) | ε-Caprolactam selecitvity (percent) |
|---|---|---|
| Oxycaproic acid methyl ester | 79 | 87 |
| Oxycaproic acid ethyl ester | 83 | 82 |
| Oxycaproic acid propyl ester | 76 | 85 |
| Oxycaproic acid cyclohexyl ester | 75 | 85 |
| Oxycaproic acid | | [1] 73 |
| Oxycaproic acid amide | | [1] 86 |

[1] Yield.

NOTE.—The conversion of oxycaproic acid and oxycaproic acid amide was difficult to measure so that the yields of ε-caprolactam on the fed raw materials were indicated.

EXAMPLE 11

A series of reactions was conducted by using a copper-chromium-manganese oxide catalyst (Cu:Cr:Mn=1:1:0.03)

and using formylvaleric acid and its derivatives shown in Table 7.

The reaction temperature was 280° C., the pressure in the reaction was atmospheric, the space velocity of the gaseous mixture was 1000 l./(hr.)(l.) and the composition of the gas was 2% of the raw material, 8% ammonia, 50% hydrogen and 40% steam. The results of analyses of the respective reaction products at the end of 6 hours' reaction are shown in Table 7.

TABLE 7

| Raw materials | Conversion (percent) | ε-Caprolactam selectivity (percent) |
|---|---|---|
| Formylvaleric acid | 100 | 89 |
| Methyl formylvalerate | 99 | 95 |
| Ethyl formylvalerate | 100 | 93 |
| Dimethyl formylvalerate acetal methyl ester | 98 | 91 |
| Diethyl formylvalerate acetal ethyl ester | 99 | 92 |

EXAMPLE 12

A series of reactions was conducted by using three-component catalysts prepared by adding such various metal oxides as are shown in Table 8 to copper-chromite. The composition of the catalyst was Cu:Cr:added metal =1:1:0.02.

For the reaction raw material was used dimethyl adipate. The pressure in the reactor was atmospheric. The reaction temperature was 260° C. The space velocity of the gaseous mixture was 1200 l./(hr.)(l.). The composition of the gas was 2% dimethyl adipate, 18% ammonia, 40% hydrogen and 40% steam. The results of analyses of the respective reaction products at the end of 25 hours' reaction are shown in Table 8.

TABLE 8

| Added metals | Dimethyl adipate conversion (percent) | ε-Caprolactam selectivity (percent) |
|---|---|---|
| None | 91 | 83 |
| Barium | 96 | 89 |
| Manganese | 95 | 92 |
| Magnesium | 91 | 84 |
| Aluminum | 95 | 83 |
| Vanadium | 99 | 85 |
| Iron | 93 | 87 |
| Cobalt | 100 | 91 |
| Nickel | 100 | 90 |
| Zinc | 99 | 95 |
| Molybdenum | 100 | 96 |
| Rhodium | 99 | 92 |
| Palladium | 100 | 87 |
| Silver | 100 | 86 |
| Tungsten | 100 | 88 |
| Platinum | 100 | 85 |
| Tin | 93 | 83 |
| Antimony | 95 | 83 |
| Bismuth | 94 | 86 |
| Cadmium | 99 | 89 |

It will be clear from the above that, when a catalyst prepared by adding a third metal to copper-chromite is used, the catalytic activity is increased while maintaining its effective life term.

What we claim is:

1. A process for preparing ε-caprolactam characterized by reacting at least one starting compound represented by the general formula:

X—(CH$_2$)$_4$COY 

wherein X represents CHO, —CH(OR)(OR'), —COOH, —COONH$_4$, —CONH$_2$ or —COOR", Y represents OH, ONH$_4$, NH$_2$ or OR''' and each of R, R', R" and R''' represents methyl, ethyl, propyl, butyl or cyclohexyl group, in a gaseous phase with ammonia, in the presence of hydrogen at a partial pressure of 0.01 to 3 atmospheres at a temperature of 120 to 350° C. and in the presence of a copper-chromite catalyst.

2. A process for preparing ε-caprolactam according to claim 1 wherein the reaction system further comprises water.

3. A process for preparing ε-caprolactam according to claim 1 wherein the catalyst further comprises a metal selected from the group consisting of barium, magnesium, calcium, strontium, aluminium, gallium, titanium, vanadium, manganese, iron, cobalt, nickel, zinc, molybdenum, ruthenium, rhodium, palladium, silver, cadmium, tin, lead, antimony and bismuth.

4. A process as claimed in claim 3 wherein said metal to be added to the catalyst is 0.001–1 atom of copper.

5. A process as claimed in claim 1 wherein the reaction in vapor phase is conducted at a temperature of 170–300° C.

6. A process as claimed in claim 1 wherein the partial pressure of hydrogen is 0.1–1.5 atmospheres.

7. A process as claimed in claim 1 wherein the catalyst comprises 0.1–5 atoms of chromium per atom of copper.

8. A process as claimed in claim 1 wherein the amount of ammonia is 1–100 mols per mol of the starting compound.

9. A process as claimed in claim 2 wherein the amount of water is 0–200 mols per mol of the starting compound.

10. A process as claimed in claim 1 wherein the catalyst comprises 0.1–3 atoms of chromium per atom of copper.

11. A process as claimed in claim 1, wherein the amount of ammonia is 2 to 50 moles per mol of the starting compound.

12. A process as claimed in claim 2 wherein the amount of water is 10 to 100 mols per mol of the starting compound.

13. A process as claimed in claim 3 wherein said metal to be added to the catalyst is 0.01–0.2 atom per atom of copper.

References Cited

UNITED STATES PATENTS 2,817,646  12/1957  Payne _____ 260—239.3
3,317,516   5/1967  Mifune et al. _____ 260—239.3
2,223,303  11/1940  Lazier _____ 260—577

FOREIGN PATENTS 763,966   7/1967  Canada _____ 260—239.3

HENRY R. JILES, Primary Examiner

R. J. BOND, Assistant Examiner